US011416304B2

(12) United States Patent
Jimbo

(10) Patent No.: US 11,416,304 B2
(45) Date of Patent: Aug. 16, 2022

(54) VIRUS SCANNING OPERATION USER CONTROL

(71) Applicant: Junya Jimbo, Tokyo (JP)

(72) Inventor: Junya Jimbo, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 396 days.

(21) Appl. No.: 16/442,705

(22) Filed: Jun. 17, 2019

(65) Prior Publication Data

US 2020/0012529 A1 Jan. 9, 2020

(30) Foreign Application Priority Data

Jul. 5, 2018 (JP) .............................. JP2018-128463

(51) Int. Cl.
*G06F 9/50* (2006.01)
*G06F 21/56* (2013.01)

(52) U.S. Cl.
CPC ............ *G06F 9/5055* (2013.01); *G06F 9/505* (2013.01); *G06F 21/566* (2013.01)

(58) Field of Classification Search
CPC ...... G06F 9/5055; G06F 9/505; G06F 21/566; G06F 21/56
See application file for complete search history.

(56) References Cited

U.S. PATENT DOCUMENTS

| 7,085,934 B1 * | 8/2006 | Edwards ................. G06F 21/56 702/186 |
| 7,752,623 B1 * | 7/2010 | Crawford, Jr. ........ G06F 9/5077 718/104 |
| 8,584,242 B2 * | 11/2013 | Lagar-Cavilla ....... G06F 21/566 726/24 |
| 9,141,794 B1 * | 9/2015 | Soubramanien ...... G06F 21/566 |
| 9,323,929 B2 * | 4/2016 | Fiala ....................... G06F 21/56 |
| 9,384,040 B2 * | 7/2016 | Jensen .................... G06F 9/505 |
| 11,082,444 B2 * | 8/2021 | MacLeod ............ H04L 63/0236 |
| 2008/0184370 A1 | 7/2008 | Ouchi |
| 2014/0007106 A1 * | 1/2014 | Weksler .................. G06F 9/485 718/100 |

(Continued)

FOREIGN PATENT DOCUMENTS

JP 2004-213417 7/2004
JP 2010-287046 A 12/2010

(Continued)

OTHER PUBLICATIONS

Extended European Search Report dated Nov. 5, 2019, issued in corresponding Euruvean Application No. 19181135.5.

(Continued)

*Primary Examiner* — Benjamin C Wu
(74) *Attorney, Agent, or Firm* — Harness, Dickey & Pierce, P.L.C.

(57) ABSTRACT

An embedded device, a method for executing a virus scan program, and a non-transitory storage medium storing instructions for executing the virus scan program are provided. The embedded device on which the virus scan program for detecting computer virus operates starts a virus scan, displays a first display component for receiving an instruction to pause the virus scan, receives the instruction to pause the virus scan, and pauses the virus scan when the instruction to pause the virus scan is received.

12 Claims, 11 Drawing Sheets

(56) References Cited

U.S. PATENT DOCUMENTS

| | | | |
|---|---|---|---|
| 2014/0181975 A1* | 6/2014 | Spernow | G06F 21/562 726/23 |
| 2015/0333971 A1* | 11/2015 | Wang | G06F 9/4843 715/738 |
| 2016/0357394 A1* | 12/2016 | Tae | G06F 3/0488 |
| 2016/0371070 A1 | 12/2016 | Jimbo | |
| 2017/0212714 A1 | 7/2017 | Watanabe et al. | |
| 2018/0167520 A1 | 6/2018 | Jimbo | |
| 2019/0238422 A1* | 8/2019 | Raney | H04L 41/22 |
| 2020/0192682 A1* | 6/2020 | Kang | G06F 1/3206 |

FOREIGN PATENT DOCUMENTS

| | | |
|---|---|---|
| JP | 2011-029848 A | 2/2011 |
| JP | 2014-078161 | 5/2014 |
| JP | 2018-073035 A | 5/2018 |
| WO | WO2014/044109 A1 | 3/2014 |

OTHER PUBLICATIONS

'Symantec (TM) Endpoint Protection 14 Windows Client Gude' Oct. 2016, pp. 17-39 https://symwisedownload.symantec.com/resources/sites/SYMWISE/content/live/DOOUMENTATION/9000/DOC9445/en_US/Client_Guide_SEP14.pdf_gda_=1572138850_42be3764846428bb9cc1b8fab8cc4751.

Office Action dated Mar. 29, 2022 issued in corresponding Japanese Patent Application No. 2018-128463.

Partial Translation of Keiichi Ikeda, Oct. 25, 2008, Light Operation even on Netbooks "McAfee Antivirus Plus 2012.".

Partial Translation of Yuki Hayashi, Dec. 3, 2011, Comparison of Norton and Virus Buster.

\* cited by examiner

FIG. 8A

1. The virus scan is executed when in the idle state during the virus scan execution time slot.
2. User starts operation on the operation panel.
3. Application software other than the virus scan is activated.
4. The virus scan continues without shifting to non-idle state.
5. The application software works slower.

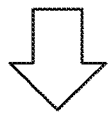

User's work stagnates, and user-friendliness is lowered

FIG. 8B

1. The virus scan is executed when in the idle state during the virus scan execution time slot.
2. User starts operation on the operation panel.
3. User pauses virus scan to improve performance of application software.
4. User activates application software other than the virus scan.

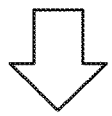

Operation of application software becomes easy
and user-friendliness of embedded device is not degraded

VIRUS SCANNING OPERATION USER CONTROL

CROSS-REFERENCE TO RELATED APPLICATIONS

This patent application is based on and claims priority pursuant to 35 U.S.C. § 119(a) to Japanese Patent Application No. 2018-128463, filed on Jul. 5, 2018 in the Japan Patent Office, the entire disclosure of which is hereby incorporated by reference herein.

BACKGROUND

Technical Field

The present disclosure relates to an embedded device, a method for executing a virus scan program, and a non-transitory storage medium storing instructions for executing a virus scan program.

Background Art

A virus scan is one technique for detecting a computer virus (hereinafter simply referred to as a virus) that has invaded a computer. The virus scan reads program files or data files stored in a storage device such as a hard disk and determines that a virus is detected if the data matches information on viruses, such as a signature described in a pattern file.

SUMMARY

Embodiments of the present disclosure described herein provide a novel embedded device, a method for executing a virus scan program, and a non-transitory storage medium storing instructions for executing the virus scan program. The embedded device on which the virus scan program for detecting computer viruses operates starts a virus scan, displays a first display component for receiving an instruction to pause the virus scan, receives the instruction to pause the virus scan, and pauses the virus scan when the instruction to pause the virus scan is received.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 8A and FIG. 8B are diagrams illustrating an effect of the virus scan according to embodiments of the present disclosure compared to a conventional virus scan;

Figure 1A:
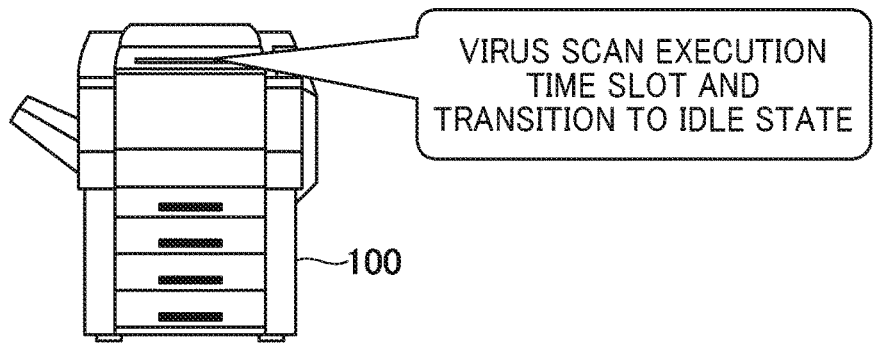
FIG. 1A and FIG. 1B are diagrams illustrating an example of how an embedded device performs a virus scan according to embodiments of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Hereinafter, an embedded device and a virus scan program execution method performed by the embedded device is described with reference to the drawings.

First Embodiment

Outline of Execution Control of Virus Scan

Figure 1B:
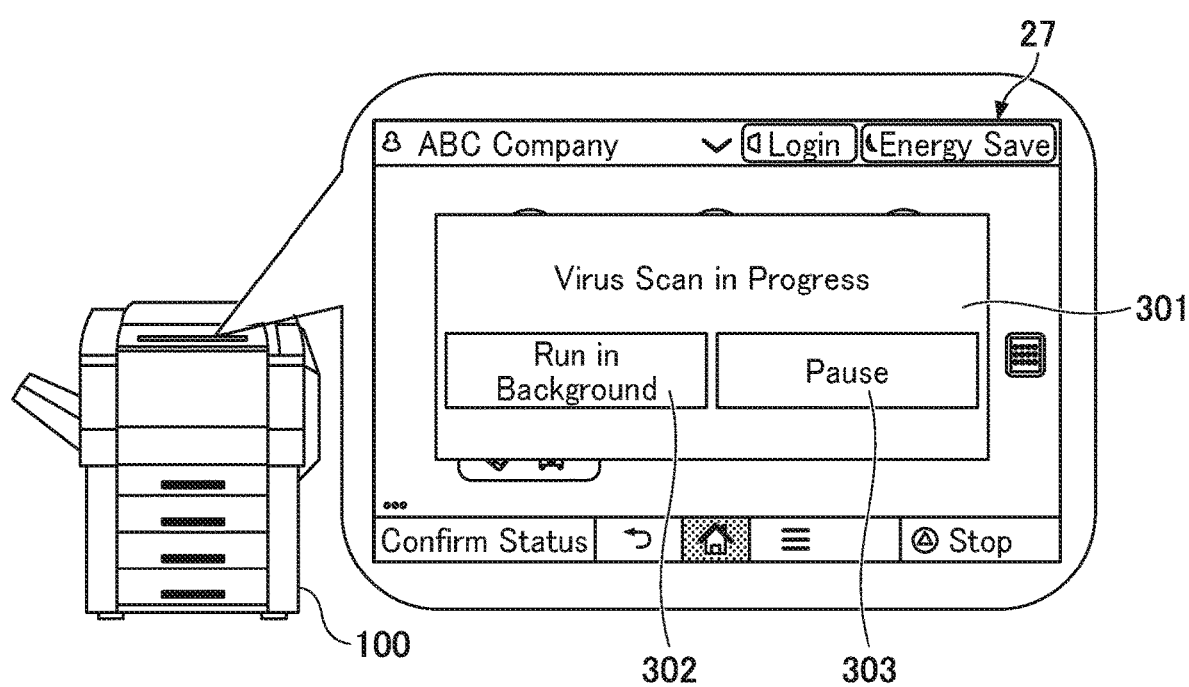

The general outlines of execution control of a virus scan executed by the embedded device of a first embodiment is described with reference to FIG. 1A and FIG. 1B. FIG. 1A and FIG. 1B are diagrams illustrating an example of how an embedded device performs the virus scan according to the first embodiment.

FIG. 1A illustrates conditions for starting the virus scan. As an example, the embedded device 100 starts a virus scan when in "virus scan execution time slot" and "transition to idle state" are confirmed.

FIG. 1B is a diagram illustrating an example of a virus scan in progress screen 301 displayed on an operation panel 27 after a start of the virus scan. When the virus scan starts, the embedded device 100 displays the virus scan in progress screen 301 during execution of the virus scan. In the virus scan in progress screen 301, a run in background button 302 and a pause button 303 are displayed.

When the run in background button 302 is pressed, the embedded device 100 executes the virus scan in the background. When the virus scan is executed in the background, the resources (CPU, memory, etc.) of the embedded device 100 distributed to the virus scan operation are reduced and the embedded device 100 can execute the virus scan without prolonging the waiting time of the user so much. The user who feels that the operation of the embedded device 100 with the virus scan executed in the background is slow can select the pause button 303 next time. The pause button 303 is a button for suspending the virus scan. In the present embodiment, "suspended" and "paused" are not strictly distinguished. Also, as described below, the virus scan can be cancelled even after the run in background button 302 is pressed.

In this way, users who do not feel that the virus scan in the background is slow do not have to cancel the virus scan, and users who feel that the virus scan in the background is too slow can choose to pause the virus scan, thereby making the embedded device 100 more user-friendly. In addition, when the embedded device 100 is not being used, the embedded device 100 can execute the virus scan without reducing resources, resulting in efficient virus scan.

Therefore, the embedded device 100 according to the present embodiment can perform efficient virus scan while becoming more user-friendly to the user who uses the embedded device 100.

Terms Used in This Disclosure

A computer virus is a program designed to intentionally cause damage to a third party program or database, and is a program having at least one of a self-infection function, a latent function, or a disease onset function. In the present embodiment, the computer virus is simply called a virus. Moreover, although the virus is a kind of malware, malware is assumed to be included in the term "virus" in the present embodiment. Therefore, viruses herein include worms (malware that exists independently rather than parasitically on files) and Trojan Horses (malware that spoofs image files etc.).

An embedded device refers to a machine, an apparatus, or a device in which a computer system is incorporated to implement a specific function. The term "embedded device" may be used in contrast to a personal computer (PC) that performs a wide variety of functions for general purpose applications. Therefore, an apparatus other than a PC that can execute a program can be considered as the embedded device. For example, an MFP, copier, printer, facsimile, scanner, projector, video conference terminal, electronic whiteboard, drone, digital signage, etc. are also the embedded devices. Note that embedded devices are not limited to devices listed above.

Hardware Configuration

Figure 2:
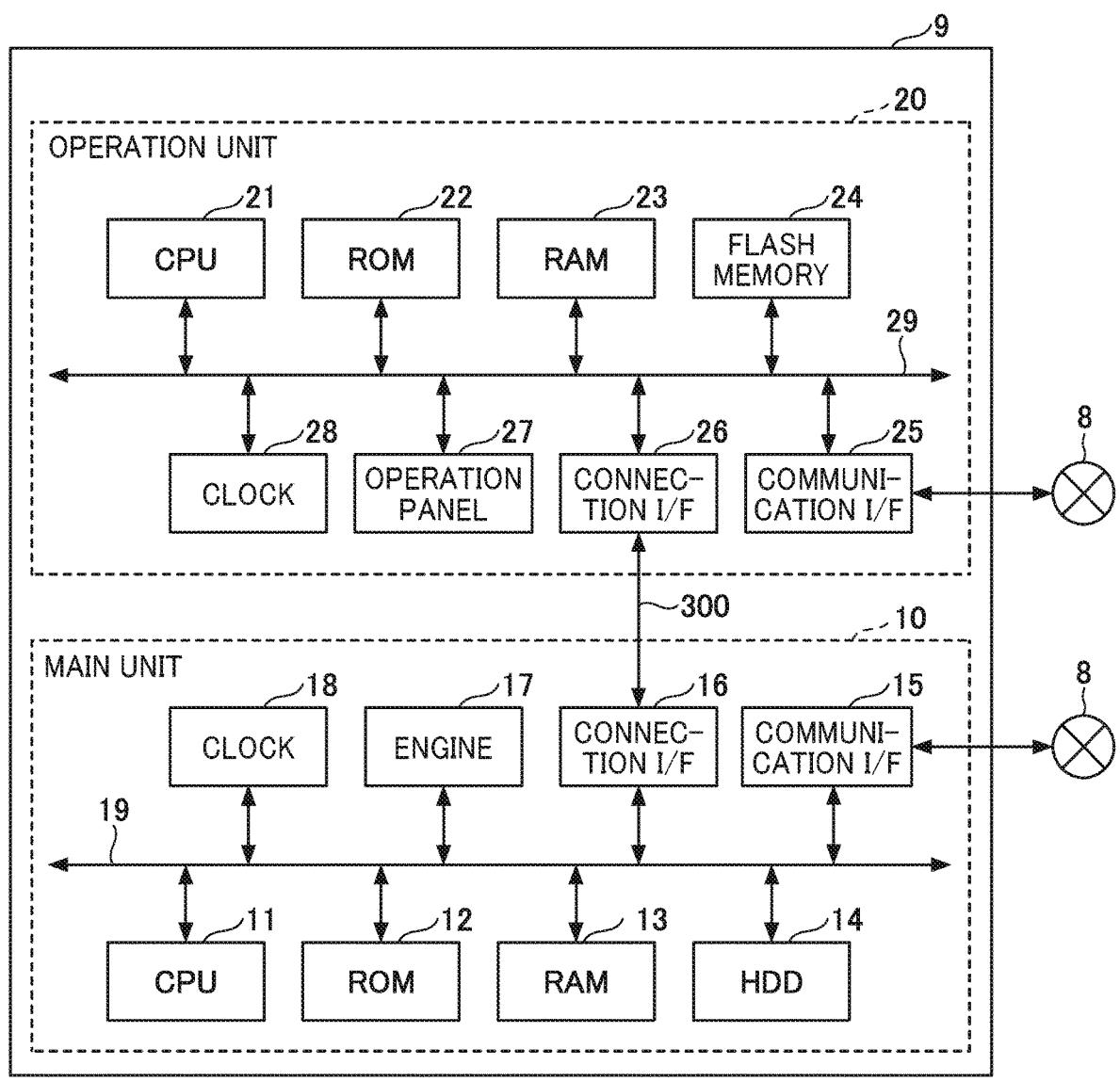
FIG. 2 is a block diagram illustrating a hardware configuration of a multifunction peripheral (MFP) according to embodiments of the present disclosure.

An example of a hardware configuration of the embedded device 100 is described with reference to FIG. 2. In FIG. 2, an MFP 9 is described as an example of the embedded device 100.

FIG. 2 is a block diagram illustrating a hardware configuration of the MFP 9 according to the present embodiment. As illustrated in FIG. 2, the MFP 9 includes a main unit 10 and an operation unit 20. The main unit 10 and the operation unit 20 are communicably connected to each other through a dedicated communication path 300. The communication path 300 may use, for example, a Universal Serial Bus (USB) standard, but the communication path 300 may be of any other wireless or wired standard.

The main unit 10 can perform an operation according to the operation accepted by the operation unit 20. The main unit 10 can also communicate with an external device such as a client PC and can perform an operation according to an instruction received from the external device.

Next, a hardware configuration of the main unit 10 is described. As illustrated in FIG. 2, the main unit 10 includes a central processing unit (CPU) 11, a read only memory (ROM) 12, a random access memory (RAM) 13, a hard disk drive (HDD) 14, and a communication interface (I/F) 15, a connection I/F 16, an engine 17, and a clock 18 which are connected with one another through a system bus 19. For convenience of explanation, in FIG. 3, the main unit 10 has been described by taking the configuration having the HDD 14 as an example. However, for example, there may be a configuration in which the HDD 14 is not provided, and a sufficient storage space cannot be secured.

The CPU 11 controls overall operation of the main unit 10. The CPU 11 controls the overall operation of the main unit 10 by executing programs stored in the ROM 12, the HDD 14, and the like using the RAM 13 as a work area to implement various functions such as a copy function, a scan function, a facsimile function and a print function.

The communication I/F 15 is an interface for connecting to the network 8. The connection I/F 16 is an interface for communicating with the operation unit 20 through the communication path 300.

The engine 17 is hardware that performs processing other than general-purpose information processing and communication for implementing the copy, scan, facsimile, and print functions. For example, a scanner for scanning and reading an image of a document, a plotter (image forming unit) for printing on a sheet material such as paper, and a facsimile unit for performing facsimile communication are provided. Furthermore, a specific option such as a finisher for sorting the printed sheet material or an automatic document feeder (ADF) for automatically feeding a document can be provided. The clock 18 is, for example, a real time clock (RTC) that keeps current time.

Next, a hardware configuration of the operation unit 20 is described. As illustrated in FIG. 2, the operation unit 20 includes a CPU 21, a ROM 22, a RAM 23, a flash memory 24, a communication I/F 25, a connection I/F 26, an operation panel 27, and a clock 28 which are connected with one another through a system bus 29. For convenience of explanation, in FIG. 2, the operation unit 20 has been described by taking the configuration having the flash memory 24 as an example, but there may be a configuration that do not have the flash memory 24, for example.

As is apparent from the configuration illustrated in FIG. 2, the operation unit 20 and the main unit 10 have functions of a computer or an information processing device. For this reason, it is preferable that a virus may invade and that a virus scan be appropriately performed.

Software Configuration

Figure 3:
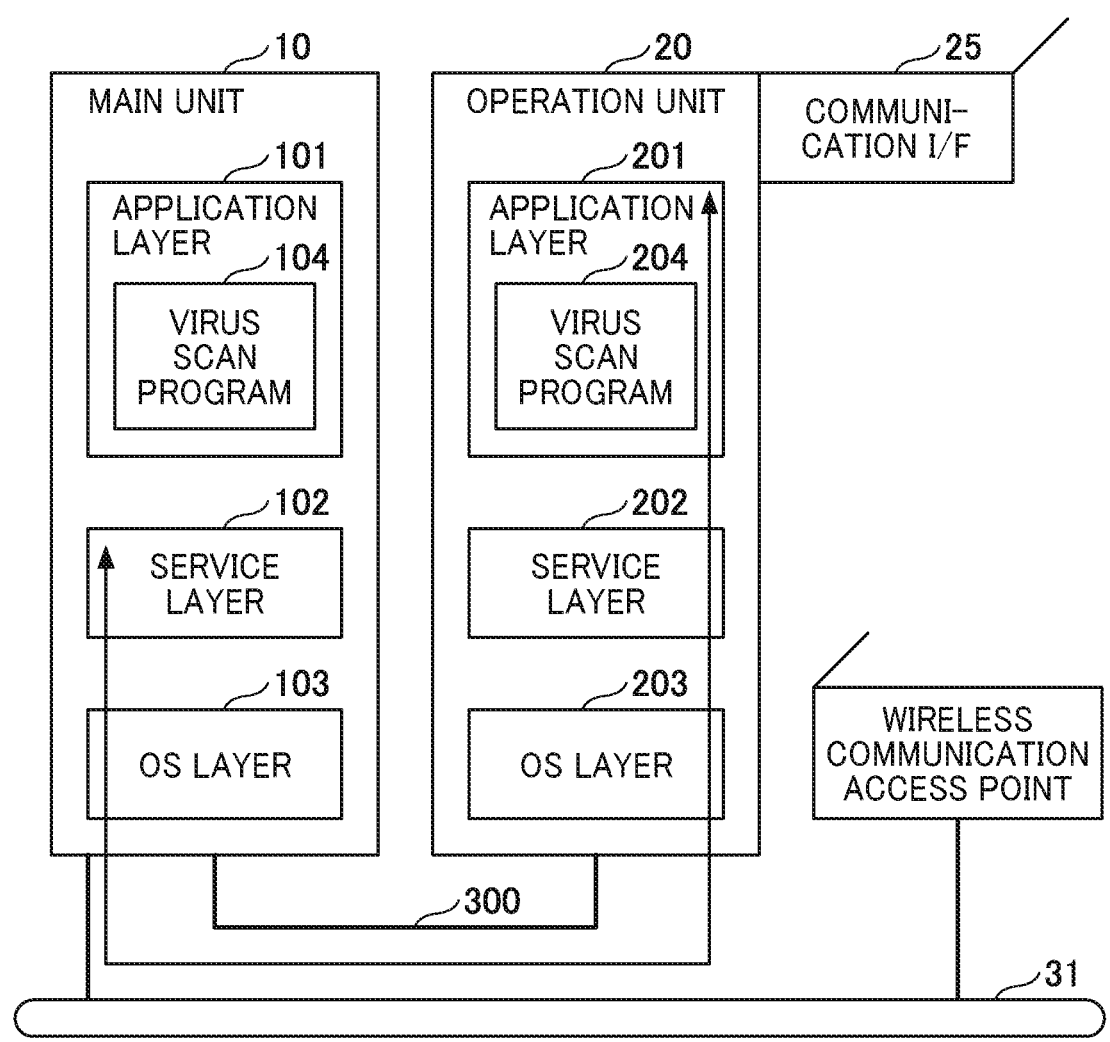
FIG. 3 is a block diagram illustrating a software configuration of the MFP according to embodiments of the present disclosure.

Next, a software configuration of the MFP 9 is described with reference to FIG. 3. FIG. 3 is a block diagram illustrating a software configuration of the MFP 9 according to the present embodiment. The main unit 10 includes an application layer 101, a service layer 102, and an operating system (OS) layer 103. The entities of the application layer 101, the service layer 102, and the OS layer 103 are various types of software stored in the ROM 12 or the HDD 14. Various functions are provided by the CPU 11 executing this software.

The software of the application layer 101 is application software that causes hardware resources to operate to provide specific functions. Examples of the application software include a copy application that provides the copy function, a scan application that provides the scan function, a facsimile application that provides the facsimile function, and a print application that provides the print function.

The software of the service layer 102, which intervenes between the application layer 101 and the OS layer 103, provides the application with an interface for using the hardware resources of the main unit 10. More specifically, the software for the service layer 102 provides the functions of receiving the operation requests to the hardware resources and mediating the operation requests. Examples of the operation requests that the service layer 102 receives may include a request for scanning by the scanner and a request for printing by the plotter.

The interface function by the service layer 102 may be provided also to the application layer 201 of the operation unit 20 as well as to the application layer 101 of the main unit 10. In other words, the application layer 201 (application) of the operation unit 20 is also capable of implementing functions that use the hardware resources such as the engine 17 of the main unit 10 through the interface function of the service layer 102.

The software of the OS layer 103 is an operating system (OS) that provides basic functions of controlling the hardware that the main unit 10 includes. The software of the service layer 102 converts each of the requests received from various applications for using the hardware resources, to a command that is interpretable by the OS layer 103. The software of the service layer 102 passes the command to the OS layer 103. The software of the OS layer 103 executes the command to enable the hardware resources to operate in accordance with the request by the application.

The operation unit 20 similarly includes the application layer 201, a service layer 202 and an OS layer 203. The application layer 201, the service layer 202 and the OS layer 203 of the operation unit 20 has a similar layer structure as the main unit 10. However, functions provided by application of the application layer 201 and operation requests to be received by the service layer 202 are different from those of the main unit 10. The application of the application layer 201 is mainly software for implementing a user interface (UI) function for operating or displaying functions that the main unit 10 includes, such as the copy function, the scan function, the facsimile function, and the print function. The application of the application layer 201 may be software that causes hardware resources of the operation unit 20 to operate to implement specific functions.

In the present embodiment, the software of the OS layer 103 that the main unit 10 includes and the software of the OS layer 203 that the operation unit 20 includes are different from each other. In other words, the main unit 10 and the operation unit 20 operate independently of each other on separate operating systems. For example, Linux (registered trademark) may be used as the software of the OS layer 103 of the main unit 10, and Android (registered trademark) may be used as the software of the OS layer 203 of the operation unit 20. Alternatively, the OS of the main unit 10 and the operation unit 20 may be the same.

As described above, in the MFP 9 according to the present embodiment, the main unit 10 and the operation unit 20 respectively operate on separate operating systems. Accordingly, communication between the main unit 10 and the operation unit 20 is performed as communication between separate apparatuses instead of interprocess communication within a common apparatus. Examples of the communication between the main unit 10 and the operation unit 20 may include command communication, which is an operation of transmitting information (e.g., instruction contents from a user) received by the operation unit 20 to the main unit 10. Examples of the communication between the main unit 10 and the operation unit 20 may further include an operation by the main unit 10 of notifying the operation unit 20 of an event. The operation unit 20 communicates commands to the main unit 10 to use the functions of the main unit 10. Examples of the information notified from the main unit 10 to the operation unit 20 may include an execution status of operation in the main unit 10 and contents that are set in the main unit 10.

In addition, power is supplied from the main unit 10 to the operation unit 20 through the communication path 300. Accordingly, the power control of the operation unit 20 may be performed separately (independently) from the power control of the main unit 10.

As illustrated, in the present embodiment, virus scan programs 104 and 204 are executed on the application layer 101 of the main unit 10 and the application layer 201 of the operation unit 20, respectively. The virus scan program 104 compares files (program files or data files) included in the OS layer 103, the service layer 102, and the application layer 101 with virus information such as a signature described in a pattern file (pattern matching) and detects viruses by whether the patterns match. The signature is a sequence of bytes (byte sequence) common to a specific virus.

The virus scan program 204 similarly detects viruses from files included in the OS layer 203, the service layer 202, and the application layer 201.

The virus scan program and the execution control of the operation unit 20 described below assumes that the operation of the virus scan program is the same between the main unit 10 and the operation unit 20. Further, although it has been described in FIG. 3 that the virus scan is executed in the main unit 10, the virus scan may not be executed in the main unit 10.

Functions

Figure 4:
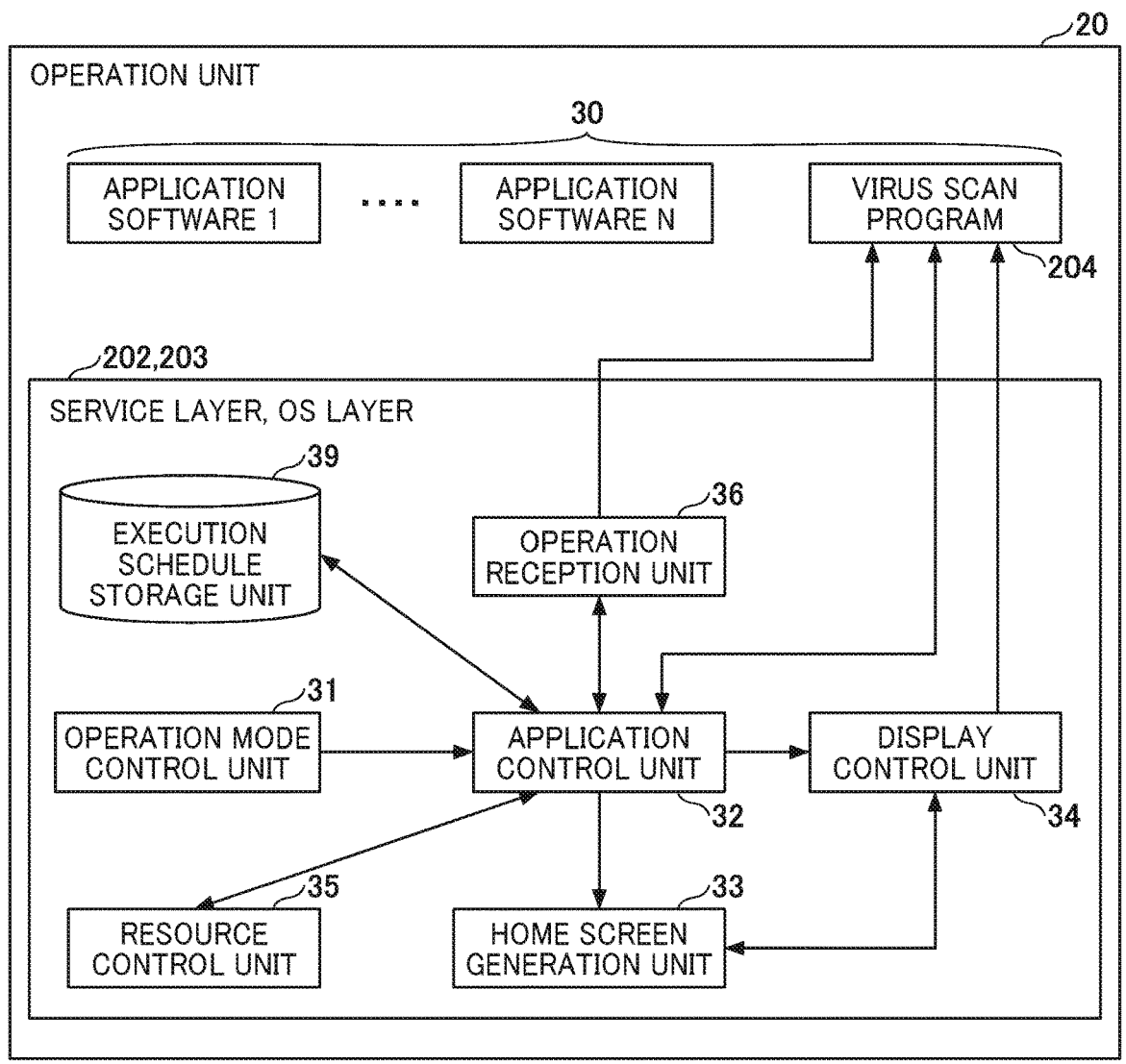
FIG. 4 is a block diagram illustrating a functional configuration of the embedded device according to embodiments of the present disclosure.

Detailed functions of the embedded device 100 are described with reference to FIG. 4. FIG. 4 is a block diagram illustrating a functional configuration of the embedded device 100 according to the present embodiment. The embedded device 100 has application software 1 to N and a virus scan program 204. Any one of the application software 1 to N is referred to as application software 30. The virus scan program 204 is also one of the application software 30.

The embedded device 100 also includes an operation mode control unit 31, an application control unit 32, a home screen generation unit 33, a display control unit 34, a resource control unit 35, and an operation reception unit 36 in the service layer 202 or the OS layer 203. Each of these functional units included in the embedded device 100 is a function implemented by one of the components illustrated in FIG. 2 operating according to an instruction from the CPU 21 according to the program deployed from the flash memory 24 to the RAM 23. The program is distributed from a server for program distribution or distributed in a storage medium.

The embedded device 100 further includes an execution schedule storage unit 39 implemented in at least one of the flash memory 24, the RAM 23, and the ROM 22 illustrated in FIG. 2. The execution schedule storage unit 39 stores a schedule for executing the virus scan.

The operation mode control unit 31 controls the operation mode of the embedded device 100. The operation mode includes at least two types of operation modes. One of the operation modes is called a normal mode that does not reduce power consumption. The other is an operation mode in which power consumption is reduced by restricting some functions of the embedded device 100, which is called an energy saving mode. The energy saving mode may be further divided into a plurality of operation modes according to the difference in a degree of reducing the power consumption. For example, a special operation mode for performing the virus scan may be prepared. For convenience of explanation, it is assumed that there are two operation modes in the present embodiment.

The operation mode control unit 31 causes the energy saving mode to return to the normal mode based on a predetermined return condition and shifts the normal mode to the energy saving mode based on a predetermined transition condition. The operation mode control unit 31 stores the return condition and the transition condition in the flash memory 24 or the like. Examples of the return conditions are a user operation such as pressing of a hard key, pressing of a soft key, opening/closing of a document cover, a detection of setting of a sheet on a manual feed tray, receiving of a print job, connection of a USB memory, or activation of a proximity sensor (infrared, sound wave, etc.). Examples of the transition conditions are time set by a timer has elapsed since the operation of the embedded device 100 in the normal mode is completed or time set by the timer has elapsed since the last operation. The time set by the timer is waiting time (time during which no operation is detected) until transition from the normal mode to the energy saving mode.

In the energy saving mode, the power supply to hardware elements such as a fixing unit of the engine 17 that consumes a large amount of power is stopped. In addition, control such as delaying the operation clock of the CPUs 11 and 21 or turning off the display of the operation panel 27 or lowering the luminance is also performed. The operation mode control unit 31 also controls the power supply in response to the return or transition of the operation mode.

Furthermore, the operation mode control unit 31 determines whether the embedded device is in an idle state or a non-idle state. The idle state is a state in which there is no active application (i.e., no application being executed). Whether the embedded device is in the idle state or the non-idle state can be determined by querying the OS. Alternatively, determination may be made as follows: For example, when both CPU load factor and RAM (memory) use rate are less than a threshold, the embedded device 100 is determined to be in the idle state, and when at least one of the CPU load factor and the RAM (memory) use rate is equal to or more than the threshold the embedded device 100 is determined to be in the non-idle state.

The fact that the application is not being executed is also considered as a state in which the embedded device 100 is not executing any job. Therefore, the idle state may be, for example, a state in which a job is not executed, a state in which communication is not being made with external devices, or a state in which internal processing such as self-diagnosis is not performed. From the above, the idle state is suitable for executing the virus scan.

Whether the idle state is included in the normal mode or the energy saving mode depends on whether to shift to the energy saving mode at the transition to the idle state. The idle state may be included in either the normal mode or the energy saving mode.

The application control unit 32 controls the operation of the application software 30 such as execution, cancellation, and monitoring of the application. In the present embodiment, the execution of the virus scan program 204 is controlled. The time slot for executing the virus scan is stored in the execution schedule storage unit 39. For example, the schedule is as follows. First virus scan is from 12:00 to 12:55, second virus scan is from 18:00 to 18:30, and third virus scan is from 21:00 to 06:00. The application control unit 32 starts the execution of the virus scan program 204 when acquiring the notification of transition to the idle state from the operation mode control unit 31 in the virus scan execution time slot. The application control unit 32 also records when the virus scan was done.

Figure 6:
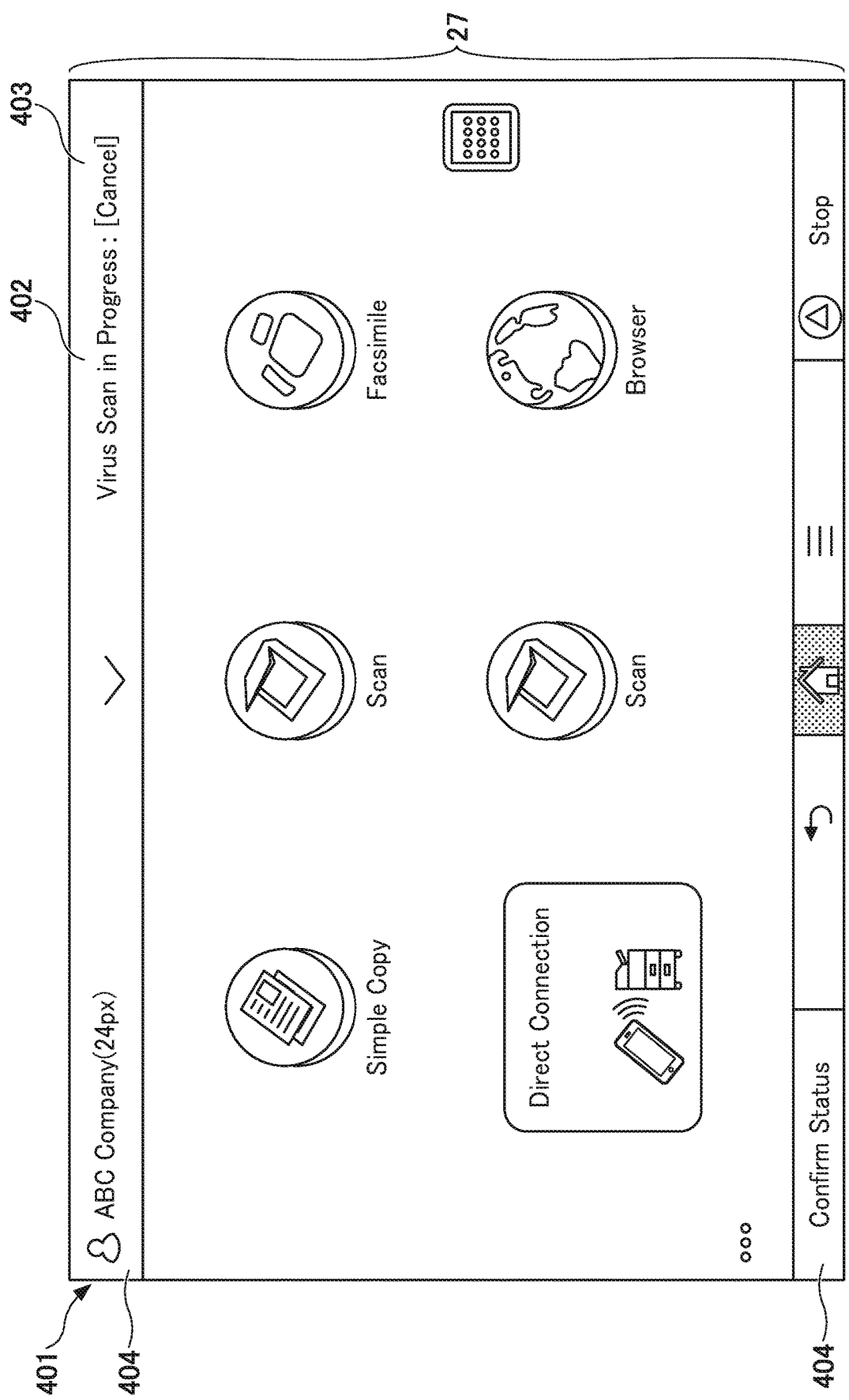
FIG. 6 is a diagram illustrating an example of a home screen indicating that a virus scan is being performed in the background according to embodiments of the present disclosure.

The home screen generation unit 33 generates a home screen which displays a selection of applications when the application software 1 to N are not operating. An example of the home screen is illustrated in FIG. 6. When the application software 1 to N is operating, each of the application software 1 to N generates a dedicated screen.

The display control unit 34 executes processing related to display on the operation panel 27. A screen, a pop-up screen, a message or the like generated by each of the application software 1 to N, the virus scan program 204, the application control unit 32, and the home screen generation unit 33 is displayed on the operation panel 27.

The resource control unit 35 reduces the allocation of the resources of the embedded device 100 used by the application. For example, when the CPU 21 supports a single core and multitasking, the resource control unit 35 controls time (time slice) of allocating an application to the CPU 21. Also, when the CPU 21 is a multi-core, the core on which the application is executed can be limited to any one or more cores. The resources allocated to the virus scan operation can be reduced by executing the control described above. When the CPU 21 is limited, the RAM 23 used by the CPU 21 is also limited, but the capacity of the RAM 23 usable by the virus scan program 204 may be directly limited.

The operation reception unit 36 accepts various operations on the embedded device 100. For example, operations on application software 1 to N may be accepted or pressing of a button for virus scan program 204 such as pause, run in background, or cancellation may be accepted.

Example of Screen Displayed by Virus Scan Program

An example of a screen displayed on the operation panel 27 by the virus scan program 204 or the application control unit 32 is described with reference to FIG. 5 and FIG. 6.

Figure 5:
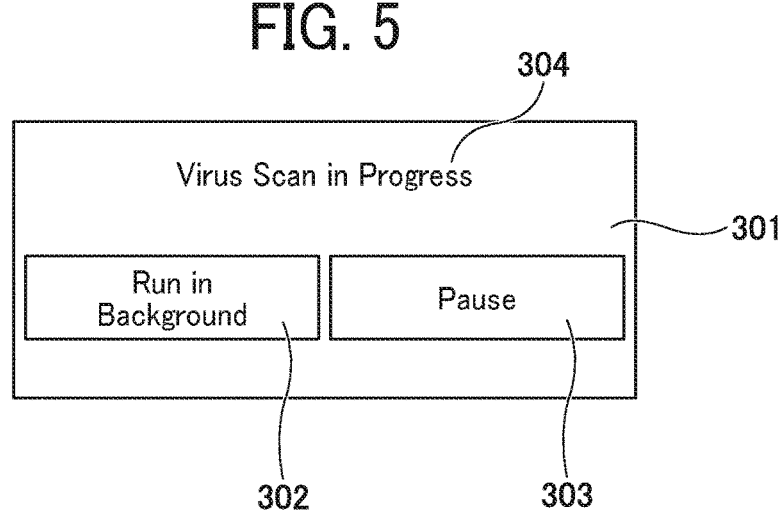
FIG. 5 is a diagram illustrating an example of a virus scan in progress screen which is a pop-up screen displayed on a home screen or an application screen generated by application software according to embodiments of the present disclosure.

FIG. 5 is an example of a virus scan in progress screen 301 displayed as a pop-up screen on the home screen 401 as illustrated in FIG. 6 or an application screen generated by application software. The virus scan in progress screen 301 has a message 304 "virus scan in progress", a run in background button 302, and a pause button 303. By pressing one of the buttons, the virus scan program 204 hides the virus scan in progress screen 301. The virus scan in progress screen 301 is a screen for prompting the user to select the run in background button 302 or the pause button 303.

The run in background button 302 is a button for executing the virus scan in the background. Background execution refers to execution in a form invisible to the user rather than as running application software displayed on the screen. Resources allocated to the virus scan program 204 are reduced when executed in the background, compared to when not executed in the background.

The pause button 303 is a button for pausing the virus scan. When the virus scan is paused, the virus scan execution position (file being scanned) at the time of pause is recorded, and when resumed, the virus scan is started (restarted) from the paused position. Order of virus scan starts from a root directory of file system, and if there is a subdirectory, the order is determined in advance, such as scanning in alphabetical order of directory names. When the virus scan is paused, the virus scan program 204 keeps track of which file has been scanned.

The conditions under which the virus scan is resumed may be the same as the conditions under which the virus scan is started. However, if, for example, the virus scan has been paused for a long time, the conditions under which the virus scan is resumed may be relaxed. For example, the virus scan may be resumed even if the embedded device 100 is not in the idle state, when in the virus scan execution time slot.

An example of the home screen 401 indicating that the virus scan is being performed in the background is illustrated in FIG. 6. An upper end and a lower end of the operation panel 27 are a system area 404, and remaining central part is an application area. A message 402 "virus scan in progress" and a cancel button 403 are displayed in the system area 404 as illustrated in FIG. 6. The system area 404 is not managed by an application software but managed by a system such as the OS. Therefore, whether the application software is running or not, or whatever application software is running (even if the user interface of application software is displayed at the center of operation panel 27), the embedded device 100 can indicate that the virus scan is in progress in the background.

When the run in background button 302 in FIG. 5 is pressed, the system area 404 displays that the virus scan is being executed in the background, as illustrated in FIG. 6. When the pause button 303 is pressed in FIG. 5, the home screen 401 or the user interface of the application software is displayed, but the system area 404 does not display that the virus scan is being executed in the background.

Operation Process

Figure 7:
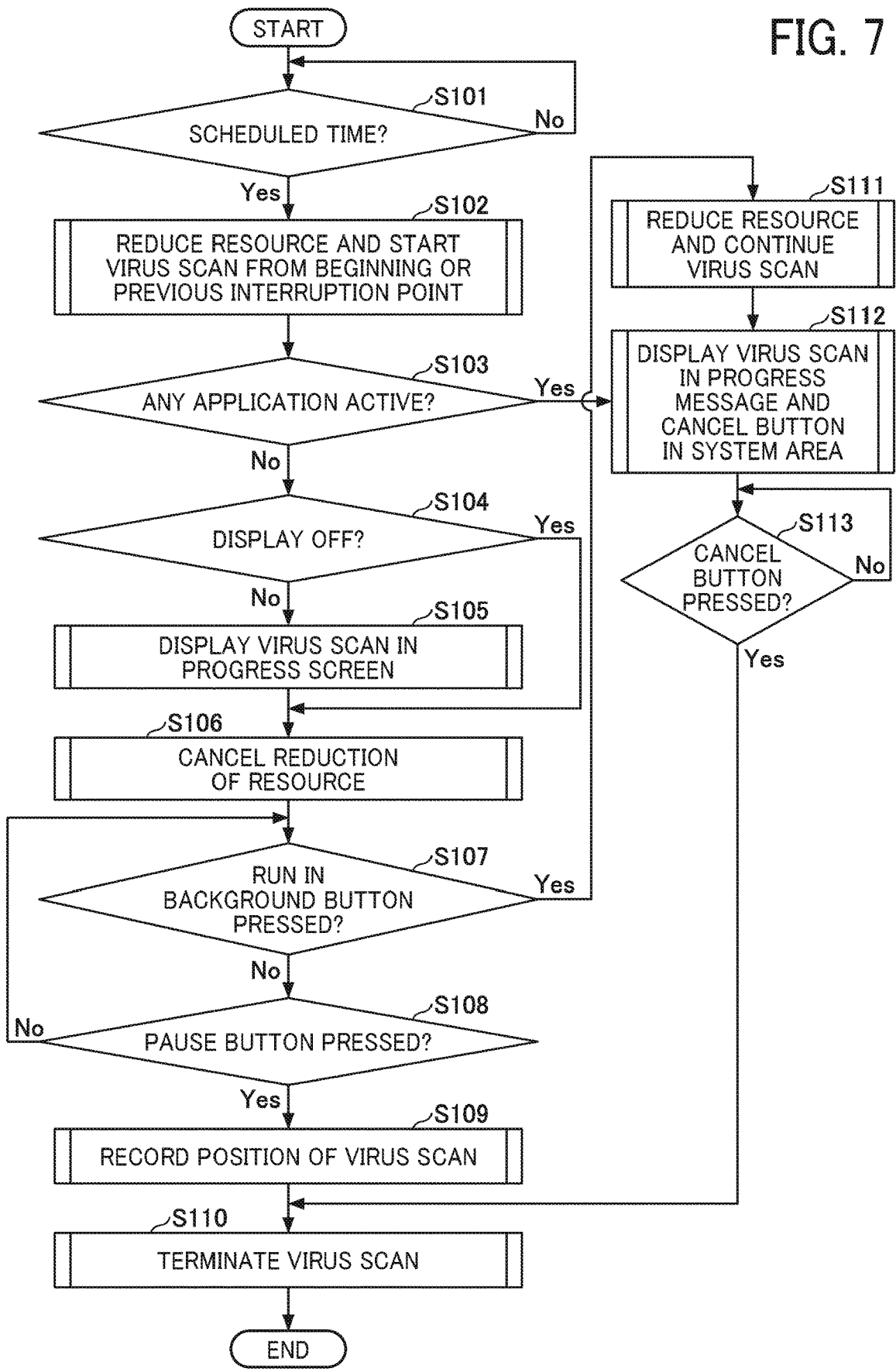
FIG. 7 is a flowchart illustrating a process of executing a virus scan with the embedded device according to embodiments of the present disclosure.

An operation process of the embedded device 100 is described with reference to FIG. 7. FIG. 7 is a flowchart illustrating a process of executing the virus scan with the embedded device 100 according to the present embodiment. The process of FIG. 7 is repeatedly executed when power of the embedded device 100 is on.

The application control unit 32 periodically obtains the time from the clock 28 and determines whether or not the current time is in the time slot of the execution schedule stored in the execution schedule storage unit 39. Also, the application control unit 32 asks the operation mode control unit 31 whether the operation mode has shifted to the idle state, and when in the idle state and when the current time is in the time slot of the execution schedule, executes the virus scan program 204 (step S101).

When the virus scan program 204 is an application resident in the RAM 23, the virus scan program 204, instead of the application control unit 32 can make the determination in step S101.

When the conditions of step S101 is satisfied, the application control unit 32 executes the virus scan program 204 (step S102). The virus scan program 204 starts the virus scan from a beginning or from a previous pause point. Whether or not the virus scan has been paused can be determined by the existence of a record of a pause point. At the time of execution, the application control unit 32 causes the resource control unit 35 to reduce allocation of resources to the virus scan program 204. The resources are reduced to reduce the impact on the operation of the running application software, because there may be other application software 1 to N being executed before the virus scan program 204 is executed.

Next, the application control unit 32 determines whether other application software 1 to N are active (step S103). The application software being active means that the application software is being executed. Therefore, the operation panel 27 is displaying a user interface of active application software.

When there is active application software (YES in step S103), the process proceeds to step S112 in order to display that the active application occupies the operation panel 27 but the virus scan is in progress. Therefore, as illustrated in FIG. 6, it is displayed that a virus scan is in progress in the system area.

When there is no active application software (NO in step S103), the application control unit 32 inquires of the operation mode control unit 31 to determine whether the display is off in the energy saving mode (step S104).

When the display on the operation panel 27 is off (YES in step S104), the process proceeds to step S106 because the virus scan in progress screen 301 illustrated in FIG. 5 should not be displayed.

When the display on the operation panel 27 is not turned off (NO in step S104), the application control unit 32 notifies the virus scan program 204 that the display on the operation panel 27 is not off, and the virus scan program 204 displays the virus scan in progress screen 301 on the operation panel 27 through the display control unit 34 (step S105). As a result, the virus scan in progress screen 301 pops up on the home screen 401.

Next, the application control unit 32 causes the resource control unit 35 to cancel the reduction in resources, since there is no active application software (step S106). Note that the reduction may not be canceled completely but may instead be moderated.

Next, the application control unit 32 determines whether pressing of the run in background button 302 on the virus scan in progress screen 301 illustrated in FIG. 5 has been received by the operation reception unit 36 (step S107).

When the pressing of the run in background button 302 is received (YES in S107), the process proceeds to step 5111 in order to reduce resources to be allocated to the virus scan program 204.

When the pressing of the run in background button 302 is not received (NO in step S107), the application control unit 32 determines whether or not the pressing of the pause button 303 is received from the operation reception unit 36 (step S108).

When the pressing of the pause button 303 is not received (NO in step S108), the process returns to step 5107.

When the pressing of the pause button 303 is received (YES in step S108), the virus scan program 204 stores the file path currently being scanned in the nonvolatile memory and ends the virus scan process (step S109).

After recording the position of the virus scan, the virus scan program 204 terminates (step S110).

When the pressing of the run in background button 302 is received (YES in S107), in step S111, the application control unit 32 causes the resource control unit 35 to reduce the resources allocated to the virus scan program 204, and the virus scan program 204 continues the virus scan (step S111). In this manner, by pressing the run in background button 302, the embedded device 100 can be used while continuing the virus scan.

Also, when there is active application software (YES in step S103), the application control unit 32 displays a message that the virus scan is in progress and the cancel button 403 on the system area 404 through the display control unit 34 (step S112).

The application control unit 32 determines whether pressing of the cancel button 403 in the system area 404 illustrated in FIG. 6 has been received from the operation reception unit 36 (step S113).

When the cancel button 403 is pressed (YES in step S113), the application control unit 32 notifies the virus scan program 204 that the cancel button 403 has been pressed, and the virus scan program 204 terminates the virus scan (step S110).

When the cancel button 403 is not pressed (NO in step S113), the virus scan program 204 continues the virus scan until the virus scan for all file paths is complete.

Effect of Virus Scan of This Embodiment

The effect of the virus scan according to the present embodiment is described with reference to FIG. 8A and FIG. 8B. FIG. 8A and FIG. 8B are diagrams illustrating an effect of the virus scan according to the present embodiment compared to the conventional virus scan.

FIG. 8A describes problems of the conventional virus scan.
1. The virus scan is executed when in the idle state during the virus scan execution time slot.
2. User starts operation on the operation panel 27.
3. Application software other than the virus scan is activated.
4. The virus scan continues without shifting to non-idle state.
5. The application software works slower.

As described above, in the conventional virus scan, the virus scan operation is continued even if the other application software is activated, so the user's work stagnates, and user-friendliness is lowered.

FIG. 8B describes the effect of the virus scan according to the present embodiment.
1. The virus scan is executed when in the idle state during the virus scan execution time slot.
2. User starts operation on the operation panel 27.
3. The user pauses, cancels, or executes the virus scan in the background to improve performance of the application software.
4. User activates application software other than the virus scan.

Since the virus scan program 204 is not executed in the non-idle state as in "1.", the user's work is not interrupted. In addition, since the virus scan can be executed in the background as in "3." or can be paused or cancelled, the operation of the application software becomes easy and user-friendliness is not degraded. The virus scan can be efficiently executed when not run in the background, paused, or cancelled.

Second Embodiment

In a second embodiment, a modification of the procedure by which the embedded device 100 executes the virus scan is described.

Figure 9:
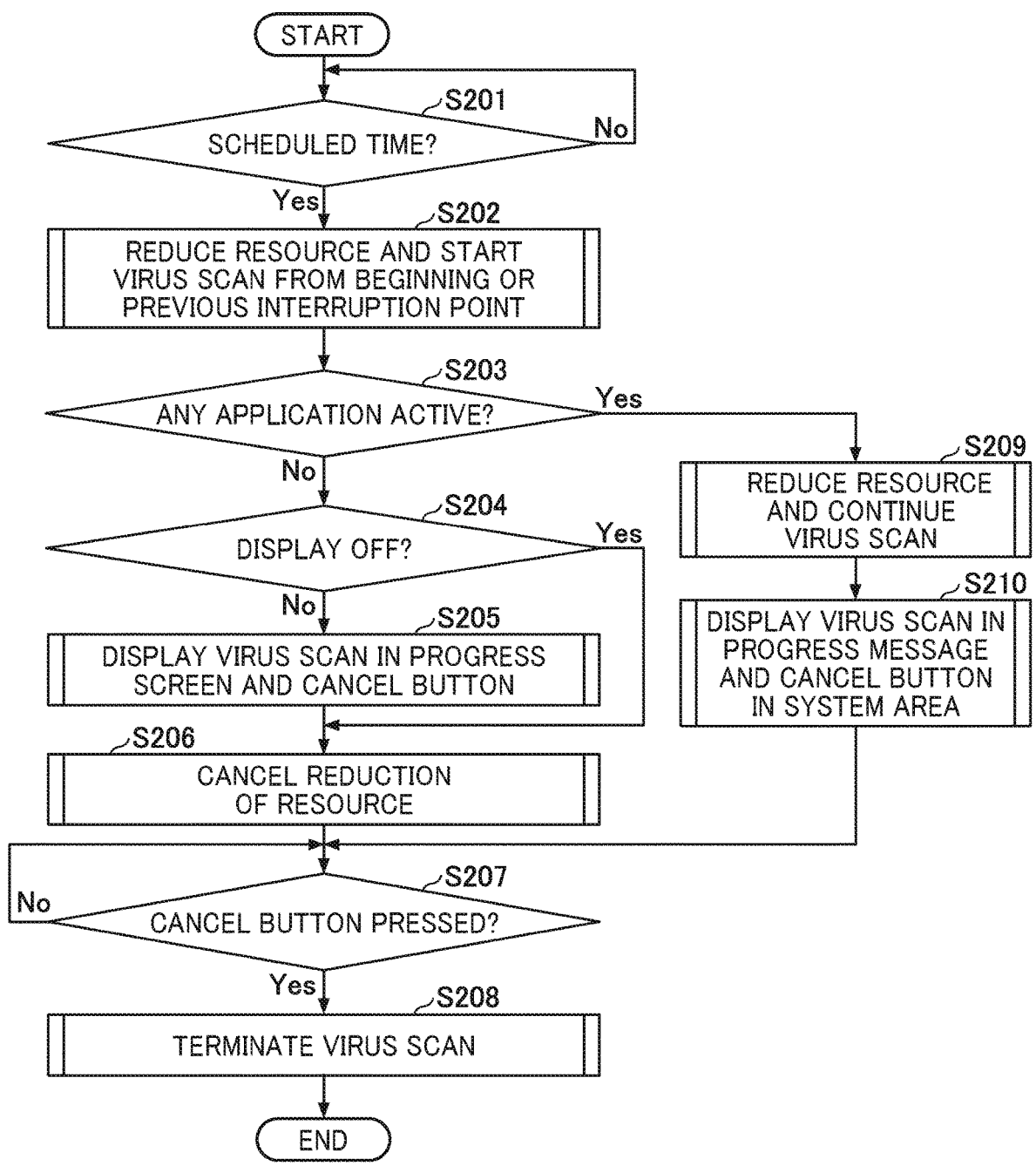
FIG. 9 is a flowchart illustrating a process of executing a virus scan with the embedded device according to embodiments of the present disclosure.

FIG. 9 is a flowchart illustrating a process of executing the virus scan with the embedded device 100 according to the second embodiment. In the description of FIG. 9, only differences from FIG. 7 are described.

The processes of steps S201 to S204 may be the same as steps S101 to S104 of FIG. 7, and therefore a redundant description thereof is omitted.

In the present embodiment, when the display on the operation panel 27 is not off (NO in step S204), the application control unit 32 displays a screen as illustrated in FIG. 6 through the display control unit 34 (step S205). That is, the message indicating that the virus scan is being performed is displayed on the system area 404 instead of the virus scan in progress screen 301, and the cancel button 403 is displayed. The virus scan program 204 is executed in the background with allocated resources reduced (step S202).

In step S205, since there is no active application software, the home screen 401 is displayed, and the message that the virus scan is in progress is displayed in the system area 404, and the cancel button 403 is displayed.

When the display on the operation panel 27 is off (YES in S204), the message that the virus scan is in progress cannot be displayed in the system area 404, and the process proceeds to step S206.

In step S206, since there is no active application software, the application control unit 32 causes the resource control unit 35 to cancel the reduction in resources. Note that the reduction may not be canceled completely, but the reduction may instead be moderated.

The application control unit 32 determines whether the pressing of the cancel button 403 of the system area 404 illustrated in FIG. 6 has been received by the operation reception unit 36 (step S207).

When the cancel button 403 is pressed (YES in step S207), the application control unit 32 notifies the virus scan program 204 that the cancel button 403 is pressed, and in response the virus scan program 204 terminates the virus scan (step S208).

When the cancel button 403 is not pressed (NO in step S207), the virus scan program 204 continues the virus scan until the virus scan of all file paths is completed.

When it is determined in step S203 that there is active application software, the virus scan program 204 continues the virus scan while the application control unit 32 causes the resource control unit 35 to reduce the allocation of resources (step S209).

Next, the application control unit 32 displays the message indicating that the virus scan is in progress and the cancel button 403 in the system area 404 (step S210). In step S210, since there is active application software, an application screen generated by the application software is displayed, and the message that the virus scan is in progress and the cancel button 403 are displayed in the system area 404. Thereafter, the process proceeds to step S207.

The virus scan program 204 initially operates in the background and displays the cancel button 403 at the top end of the operation panel 27 (system area 404) so as not to disturb the operation. When the user feels that the operation speed is reduced due to the virus scan, the user can improve by pressing the cancel button 403 immediately. Further, since the virus scan in progress screen 301 illustrated in FIG. 5 is not displayed, the user's operation is not disturbed.

The processing in this embodiment is an effective process, for example, in the embedded device 100 in which the influence of the speed reduction by the virus scan is limited. That is, in the embedded device 100 equipped with the CPU 21 (a high performance CPU) in which the user does not feel the speed reduction even when the virus scan program 204 operates in the background, the virus scan can be executed in the background and let the user cancel the virus scan as needed.

Display Example of System Area

The virus scan in progress screen 301 illustrated in FIG. 5 is not displayed in the present embodiment, and as a result it is difficult for the user to cancel the virus scan. For this reason, it is preferable to display a pause button 303 in the system area 404 illustrated in FIG. 6.

Figure 10:
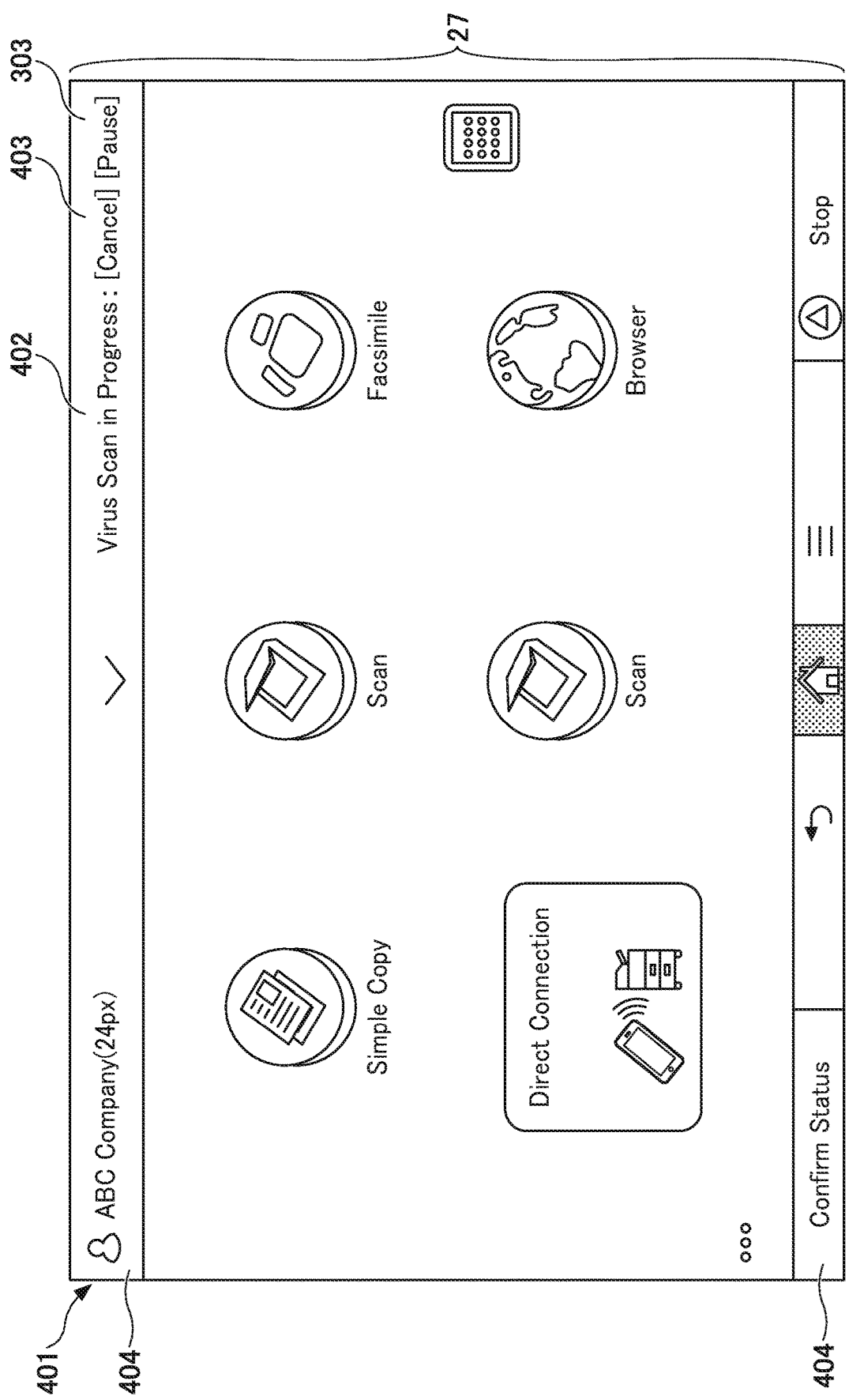
FIG. 10 is a diagram illustrating a second example of a home screen indicating that a virus scan is being performed in the background according to embodiments of the present disclosure.

FIG. 10 illustrates another example of the home screen 401 indicating that the virus scan is being performed in the background. In FIG. 10, the pause button 303 is displayed in the system area 404. The user can optionally choose to pause or to cancel the virus scan.

In the flowchart of FIG. 9, whether the cancel button 403 or the pause button 303 is pressed is determined, and when the pause button 303 is pressed, the virus scan execution position (predetermined file) at the time of pause is recorded.

The system area 404 as illustrated in FIG. 10 can also be applied to the first embodiment. That is, the system area 404 of FIG. 10 is displayed in step S112 of FIG. 7. When the user selects the run in background button 302 on the virus scan in progress screen 301, but feels that the speed is reduced, the pause button 303 instead of the cancel button 403 can be selected.

According to the embedded device 100 of the present embodiment, in addition to the effects of the first embodiment, the virus scan is executed in the background without displaying the virus scan in progress screen 301, and the system area 404 of the home screen 401 allows the virus scan to be cancelled.

Third Embodiment

In a third embodiment, processing when there is the cancel button 403 on the virus scan in progress screen 301 illustrated in FIG. 5 is described.

Figure 11:
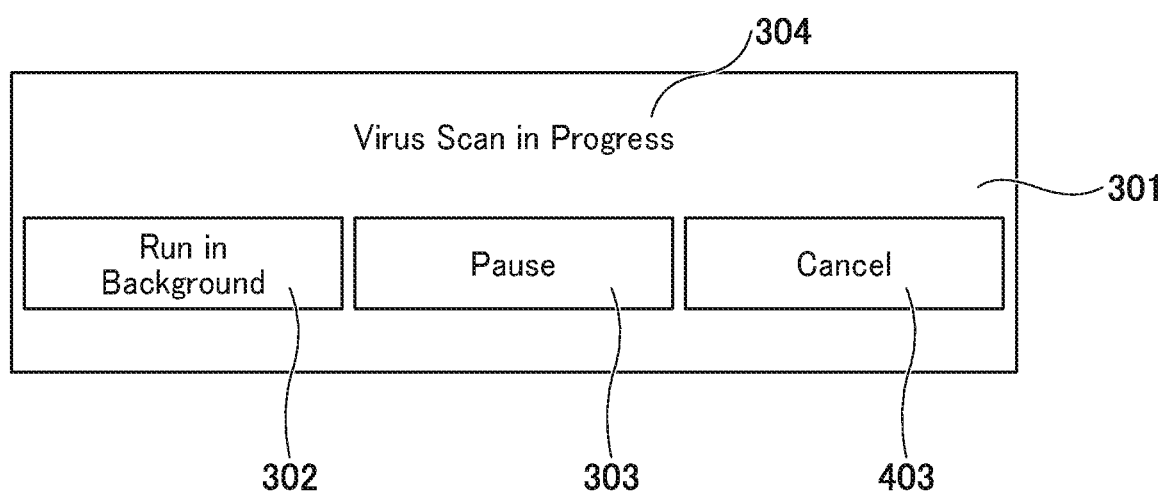
FIG. 11 is a diagram illustrating an example of a virus scan in progress screen according to embodiments of the present disclosure.

FIG. 11 is a diagram illustrating an example of the virus scan in progress screen 301 according to the third embodiment. In the description of FIG. 11, differences from FIG. 5 is mainly described. The cancel button 403 is displayed on the virus scan in progress screen 301 illustrated in FIG. 11. The cancel button 403 is a button for cancelling the virus scan, that is, has the same function as the cancel button in the system area 404 illustrated in FIG. 6. When the virus scan in progress screen 301 has the cancel button 403, the virus scan can be cancelled and started from the beginning without interruption by pausing.

Figure 12:
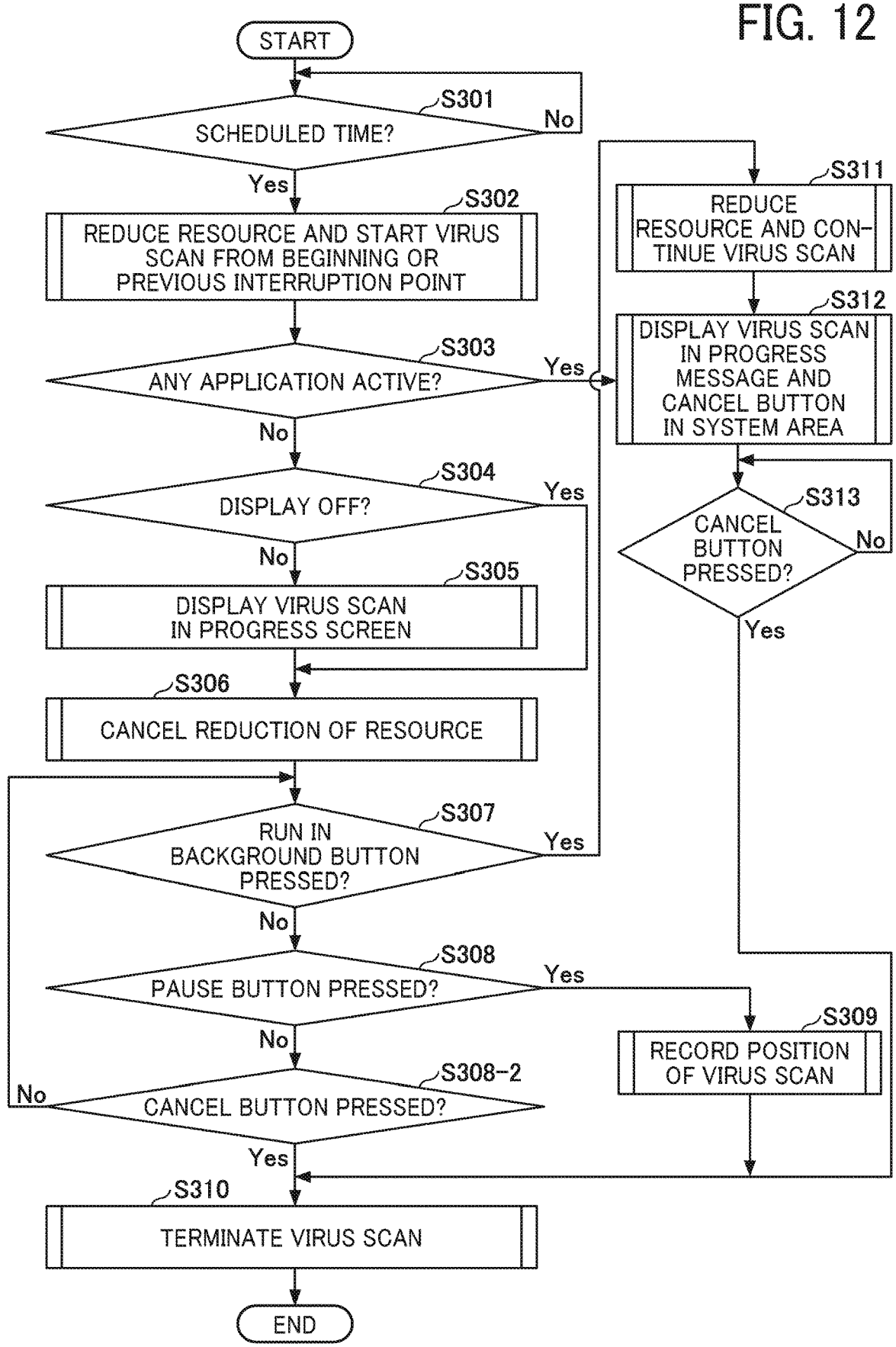
FIG. 12 is a flowchart illustrating a process of executing a virus scan with the embedded device according to embodiments of the present disclosure.

FIG. 12 is a flowchart illustrating a process of executing the virus scan with the embedded device 100. In the description of FIG. 12, only differences from FIG. 7 are described.

In FIG. 12, step S308-2 is added. In step S308-2, the application control unit 32 determines whether or not the pressing of the cancel button 403 has been received by the operation reception unit 36.

When the cancel button 403 is not pressed (NO in step S308-2), the process returns to step S307. When the cancel button 403 is pressed (YES in S308-2), the virus scan execution position is stored in step S309, and the virus scan program terminates the virus scan (step S310).

According to the embedded device 100 of the present embodiment, in addition to the effect of the first embodiment, the user can cancel the virus scan on the virus scan in progress screen 301.

Other Embodiments

Although the best mode for carrying out the present disclosure has been described using the examples described above, the present disclosure is not limited to these examples, and various modifications and substitutions can be made without departing from the scope of the present disclosure.

For example, the embedded device 100 may download the virus scan program 204 from a server and execute the virus scan as appropriate.

As the method of virus scan, in addition to pattern matching using signatures, there are also methods such as heuristics that compare virus behavior with file behavior and detect features or behavior detection which executes a file to be checked and actually confirm the behavior.

Further, the example of configuration illustrated in FIG. 4 and the like are divided according to main functions in order to facilitate understanding of processing by the embedded device 100. The present disclosure is not limited by the method and name of division of processing units. The processing of the embedded device 100 can also be divided into more processing units according to the processing content. Also, one processing unit can be divided so as to include more processes.

The pause button 303 is an example of a first display component, the run in background button 302 is an example of a second display component, and the cancel button 303 is an example of a third display component.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure. In addition, any of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA) and conventional circuit components arranged to perform the recited functions.

What is claimed is:

1. An embedded device on which a virus scan program for detecting a computer virus operates, the embedded device comprising:
    circuitry configured to:
        start a virus scan;
        display, on a display, a first display component for receiving an instruction to pause the virus scan in response to starting the virus scan;

reduce resources allocated to the virus scan program in response to starting the virus scan;
receive the instruction to pause the virus scan via the first display component;
pause the virus scan in response to the instruction to pause the virus scan being received;
display a second display component for receiving an instruction to execute the virus scan in a background with resources allocated to the virus scan reduced in response to executing the virus scan; and
reduce resources allocated to the virus scan in response to receiving the instruction to execute the virus scan in the back round;
display a third display component for receiving an instruction to cancel the virus scan in response to the virus scan being executed in the background;
determine whether there is any application software other than the virus scan program being executed in response to executing the virus scan;
display a pop-up screen prompting selection of one of the first display component or the second display component in response to determining that there is no application software other than the virus scan program being executed; and
display the third display component for receiving the instruction to cancel the virus scan and a message indicating that the virus scan is being executed in the background, without displaying the pop-up screen in response to determining that there is application software other thon the virus scan program being executed.

2. The embedded device of claim 1, wherein the circuitry is further configured to display a pop-up screen prompting selection of one of the first display component or the second display component in response to executing the virus scan.

3. The embedded device of claim 1, wherein the circuitry is further configured to display a pop-up screen prompting selection of one of the first display component, the second display component, or the third display component in response to executing the virus scan.

4. The embedded device of claim 1, wherein the circuitry is further configured to:
cancel the reduction in resources allocated to the virus scan program in response to determining that there is no application software other than the virus scan program being executed.

5. The embedded device of claim 1, wherein the circuitry is further configured to:
determine whether the embedded device is in an idle state or a non-idle state; and
execute the virus scan program in response to determining that the embedded device is in the idle state.

6. The embedded device of claim 1, wherein the circuitry is further configured to:
determine whether a current time is within a time slot; and
execute the virus scan program in response to determining that the current time is within the time slot.

7. The embedded device of claim 1, wherein the circuitry is further configured to:
determine whether the embedded device is in an idle state or a non-idle state;
determine whether a current time is within a time slot; and
execute the virus scan program in response to determining that the embedded device is in the idle state and that the current time is within the time slot.

8. A virus scan program execution method performed by an embedded device, comprising:
starting a virus scan;
displaying a first display component for receiving an instruction to pause the virus scan;
reducing resources allocated to the virus scan in response to starting the virus scan;
receiving an instruction to pause the virus scan;
pausing the virus scan in response to receiving the instruction to pause the virus scan;
displaying a second display component for receiving an instruction to execute the virus scan in a background with resources allocated to the virus scan program reduced in response to executing the virus scan;
reducing resources allocated to the virus scan program in response to receiving the instruction to execute the virus scan in the background;
displaying a third display component for receiving an instruction to cancel the virus scan in response to the virus scan being executed in the background;
determining whether there is any application software other than the virus scan program being executed;
displaying a pop-up screen prompting selection of one of the first display component or the second display component in response to determining that there is no application software other than the virus scan program being executed; and
displaying the third display component for receiving the instruction to cancel the virus scan and a message indicating that the virus scan is being executed in the background, without display in the pop-up screen in response to determining that there is application software other than the virus scan program being executed.

9. The virus scan program execution method of claim 8, further comprising displaying a pop-up screen prompting selection of one of the first display component or the second display component in response to starting the virus scan.

10. The virus scan program execution method of claim 8, further comprising displaying a pop-up screen prompting selection of one of the first display component or the second display component, or the third display component when starting the virus scan.

11. The virus scan program execution method of claim 8, further comprising:
cancelling the reduction in resources allocated to the virus scan program in response to determining that there is no application software other than the virus scan program being executed.

12. An embedded device on which a virus scan program for detecting a computer virus operates, the embedded device comprising:
circuitry configured to:
start a virus scan;
display, on a display, a first display component for receiving an instruction to pause the virus scan in response to starting the virus scan;
reduce resources allocated to the virus scan program in response to starting the virus scan;
receive the instruction to pause the virus scan via the first display component;
pause the virus scan in response to the instruction to pause the virus scan being received;
display a third display component for receiving an instruction to cancel the virus scan in response to the virus scan being executed in a background;
determine whether there is application software other than the virus scan program being executed;
display a message indicating that the virus scan is being executed in the background together with a home screen configured to receive a selection of application software, the first display component for receiving the instruction to pause the virus scan, and the third display component for receiving the instruction to cancel the virus scan in response to determining that there is no application software other than the virus scan program being executed; and display the message indicating that the virus scan is being executed in the background, the third display component for receiving the instruction to cancel the virus scan, and the first display component for receiving the instruction to pause the virus scan, together with a screen of the application software being executed in response to determining that there is application software other than the virus scan program being executed.

\* \* \* \* \*